(12) United States Patent
Nishikawa et al.

(10) Patent No.: US 6,865,038 B2
(45) Date of Patent: Mar. 8, 2005

(54) MAGNETIC TRANSFERRING METHOD, AND METHOD AND APPARATUS FOR CLEANING MAGNETIC TRANSFER MASTER MEDIUM

(75) Inventors: Masakazu Nishikawa, Kanagawa-ken (JP); Makoto Nagao, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/994,891

(22) Filed: Nov. 28, 2001

(65) Prior Publication Data
US 2002/0141088 A1 Oct. 3, 2002

(30) Foreign Application Priority Data

Nov. 28, 2000 (JP) .......................... 2000-360464
Nov. 28, 2000 (JP) .......................... 2000-361212
Dec. 13, 2000 (JP) .......................... 2000-378519

(51) Int. Cl.[7] ................................. G11B 5/86
(52) U.S. Cl. ......................................... 360/17
(58) Field of Search ...................... 360/15–17

(56) References Cited

U.S. PATENT DOCUMENTS 5,669,979 A * 9/1997 Elliott et al. .............. 134/1
5,991,104 A * 11/1999 Bonyhard .................. 360/15
6,347,016 B1 * 2/2002 Ishida et al. ................ 360/17
6,433,944 B1 * 8/2002 Nagao et al. ............... 360/16
6,469,848 B1 * 10/2002 Hamada et al. ............. 360/17

FOREIGN PATENT DOCUMENTS

| EP | 0 332 784 B1 | 9/1989 | |
| EP | 0 790 533 A2 | 8/1997 | |
| EP | 0 915 456 A1 | 5/1999 | |
| JP | 63-183623 | 7/1988 | G11B/5/86 |
| JP | 10-40554 | 2/1998 | G11B/7/085 |
| JP | 10-269566 | 10/1998 | G11B/5/84 |
| JP | 10-239923 | 11/1998 | |
| JP | 11-025455 | 1/1999 | |

* cited by examiner

Primary Examiner—Sinh Tran
Assistant Examiner—Varsha A. Kapadia
(74) Attorney, Agent, or Firm—Sughrue Mion, PLLC (57) ABSTRACT

In the magnetic transferring method for magnetically transferring an information signal such as a servo signal from the master medium to the slave medium, when magnetic transfer is performed by bringing a master medium and a slave medium into close contact with each other, the master medium bearing an information signal and the slave medium having a lubricating layer formed on the surface of its recording plane during use, and applying a transfer magnetic field, the magnetic transfer is performed by bringing the slave medium before the formation of the lubricating layer and the master medium into close contact with each other. Thus, the separation of the slave medium from the master medium after the magnetic transfer is facilitated, and the adsorption of dust on the slave medium is prevented.

5 Claims, 4 Drawing Sheets

MAGNETIC TRANSFERRING METHOD, AND METHOD AND APPARATUS FOR CLEANING MAGNETIC TRANSFER MASTER MEDIUM

BACKGROUND OF THE INVENTION

1. Field of the Invention

The present invention relates to a magnetic transferring method for performing magnetic transfer from a master medium bearing information to a slave medium.

2. Description of the Related Art

The magnetic transferring method is designed to transfer a magnetic pattern corresponding to information (e.g., servo signal) borne by a master medium by applying a transfer magnetic field while the master medium bearing transfer information by the micro uneven pattern of a magnetic material and a slave medium subjected to the transfer are kept in a state of close contact. As such magnetic transferring methods, for example, there are those disclosed in Japanese Unexamined Patent Publication Nos. 63(1988)-183623, 10(1998)-40544, 10(1998)-269566, and others.

In a hard disk, a high recording density flexible disk or the like that is used as the slave medium, the surface of a magnetic recording layer has a lubricating layer formed in order to reduce friction generated by contact with a magnetic head during use.

However, during the magnetic transfer by the above-described magnetic transferring method, a problem sometimes occurs if the lubricating layer like that described above is formed on the recording plane of the slave medium. Specifically, it may be difficult to peel off the slave medium from the master medium after the magnetic transfer is performed in close contact with the master medium. In addition, dust stuck to the master medium may be adhered to the slave medium after the close contact, causing the increase of an error rate during recording and reproducing in actual use.

Analysis of the slave medium after the magnetic transfer revealed that the meniscus of the lubricating layer formed on the recording plane brought about an increase in a close contact force between the slave medium and the master medium. It was also discovered that the dust stuck to the master medium was adsorbed on the lubricating layer. Such a phenomenon was particularly conspicuous in slave mediums including a metallic thin-film magnetic recording layer.

The high close contact force between the slave medium and the master medium makes it difficult to separate the slave medium from the master medium after the magnetic transfer. Forcible peeling-off may damage the slave medium or the master medium. If there is dust adsorbed on the lubricating layer of the slave medium during the magnetic transfer, it is difficult to remove the dust in post-treatment because of strong adhesion force. Following the high-speed rotation of the slave medium, the dust may collide with the magnetic head to cause head crashing or dropout. Consequently, an error occurrence rate may be increased.

The present invention was made in view of the foregoing problems, and it is an object of the invention to provide a magnetic transferring method designed to facilitate the separation of the slave medium from the master medium after the magnetic transfer and prevent the adsorption of dust on the slave medium.

During the magnetic transfer by the above-described magnetic transferring method, the close contact state between the slave medium and the master medium affects signal quality after the magnetic transfer. Ideally, a distance between the recording plane of the slave medium and the information bearing plane of the master medium should be set to be less than or equal to 100 nm, and the close contact is required to be in a uniform state on the full surfaces thereof.

However, dust may be present between the master medium and the slave medium, and space may be formed between the master medium and the slave medium in the vicinity of the dust depending on the size of the dust, making it impossible to realize a close contact state with a uniform distance across the full surfaces. Thus, a difference is generated in the transferred magnetic signals in accordance with the above-described distance, reducing signal quality, and generating an intensity distribution in a read out reproducing output. When the recorded signal is a servo signal, the tracking function is not sufficient, reducing reliability. Regarding the dust, it was discovered that the sticking of powder dust or the like generated during the manufacturing process of the slave medium to the surface thereof was a main cause.

The present invention was made in view of the foregoing problems, and it is an object of the invention to provide a magnetic transferring method designed to improve signal quality by making the close contact distance between the slave medium and the master medium uniform during the magnetic transfer.

In addition, during the magnetic transfer by the above-described magnetic transferring method, depending on the repeated use of the master medium, the master medium may be contaminated by foreign articles stuck to its surface. The foreign articles stuck to the master medium are mainly dust, fiber flocks, and so on, generated in the surrounding environment.

If the magnetic transfer is carried out while such articles are stuck to the master medium, close contact cannot be secured between the master medium and the slave medium in an area ranging from the dust stuck portion as a center up to a periphery. Consequently, it is impossible to carry out pattern transfer at a predetermined signal level, reducing transfer quality. When the recorded signal is a servo signal, a tracking function will not be sufficient, causing a reduction in reliability.

The repeated close contact between the master medium and the slave medium increases the sticking force of the above-described articles stuck to the surface of the master medium, and equal or more pattern transfer failures occur in all the slave media subjected to the magnetic transfer thereafter. Consequently, many defective products are produced. Further, such stuck articles may deform the surface of the master medium, leading to the loss of its normal function.

To remove the articles stuck to the master medium, the master medium before the magnetic transfer may be subjected to cleaning carried out by ultrasonic washing using a cleaning solution, wiping or the like. However, by such a method, the removed articles may be adhered again to the master medium after washing, therefore providing insufficient removal and generating a water mark on the surface of the master medium when the cleaning solution is dried or rubbing damage by a wiping material. Consequently, signal transfer failures or master medium damage may occur. In other words, even if the stuck articles are temporarily removed by the cleaning solution or the wiping material, the articles may be adhered again from the cleaning solution remaining on the surface of the master medium or the wiping material. Especially, there are some fine grains which cannot be removed.

The present invention was made in view of the foregoing problems, and objects of the invention are to provide a method and an apparatus for cleaning a master medium for magnetic transfer capable of performing high quality magnetic transfer, by removing articles stuck to the master medium in a dry process and in a non-contact manner without any re-adhesion thereof.

SUMMARY OF THE INVENTION

In accordance with the present invention, a magnetic transferring method is provided, comprising the steps of: bringing a master medium and a slave medium into close contact with each other, the master medium bearing information signals, and the slave medium having a lubricating layer formed on a surface of a recording plane during use; applying a transfer magnetic field; and performing magnetic transfer. In this case, the magnetic transfer is performed by bringing the slave medium and the master medium into close contact before formation of the lubricating layer on the slave medium.

The lubricating layer is formed on the recording plane of the slave medium after the magnetic transfer, thereby reducing friction with a magnetic head during use.

In accordance with the present invention, a magnetic transferring method is provided, comprising the steps of: bringing a master medium and a slave medium into close contact with each other, the master medium bearing information signals; applying a transfer magnetic field; and performing magnetic transfer. In this case, preferably, a recording plane of the slave medium and an information bearing plane of the master medium are brought into close contact via a liquid.

Preferably, the liquid has lubricity. This liquid may be coated on the information bearing plane of the master medium. However, preferably, the liquid having lubricity is coated on the recording plane of the slave medium. The coating of the liquid is preferably carried out immediately before close contact for the purpose of reducing the sticking of dust.

It is preferred that after the magnetic transfer, the close contact between the slave medium and the master medium is released while the slave medium is moved. The liquid stuck to the surface of the slave medium after the magnetic transfer is removed. However, if the liquid has lubricity, the liquid is used without being removed.

A close contact distance between the recording plane of the slave medium and the information bearing plane of the master medium by the interposition of the liquid is Set equal to 100 nm or less, preferably in the range of 2 to 50 nm. Liquid providing such a coating thickness is selected and, when necessary, one having lubricity, or one containing lubricant or other additives is used.

For the slave medium, before it is brought into close contact with the master medium, cleaning is performed, when necessary, to remove micro projections or dust stuck to the surface. Meanwhile, for the master medium, before it is brought into close contact with the slave medium, cleaning is performed, when necessary to remove stuck dust.

There are two magnetic transfer cases. One is a single sided sequential transfer carried out by keeping the master medium in close contact with one plane of the slave medium; and the other a double sided simultaneous transfer carried out by keeping the master media in close contact with both planes of the slave medium. A hard disk is preferred to be used as the slave medium, and a flexible disk can also be used. As a magnetic field generating means for applying a transfer magnetic field, an electromagnet device or a permanent magnet device is employed. While rotating the master medium and the slave medium in relative relation to each other, a transfer magnetic field is applied in a tracking direction from one side or both sides of a close contact portion therebetween.

As the foregoing magnetic transferring method, one is preferred, which is designed to perform magnetic transfer by first subjecting the slave medium to initial magnetization for DC-magnetizing the same in the track direction, bringing this slave medium and the master medium into close contact, the master medium having a magnetic layer formed on a micro uneven pattern corresponding to transferred information and then applying a transfer magnetic field in a direction substantially opposite to that of the initial DC magnetization of the slave medium surface. As the information, a servo signal is preferable.

In accordance with the invention, a method for cleaning a magnetic transfer master medium, used in a magnetic transferring method for magnetically transferring information from the master medium bearing the information to a slave medium is provided comprising the step of: burning and removing an article stuck to a surface of the master medium before execution of magnetic transfer by using a plasma discharge under an atmosphere of pressure-reduced reactive gas.

In accordance with the invention, an apparatus for cleaning a magnetic transfer master medium, which is used in a magnetic transferring method for magnetically transferring information from the master medium bearing the information to a slave medium is provided, comprising: a decompression vessel for housing the master medium; a pressure reducing unit for reducing pressure in the vessel; a discharge unit for generating a plasma discharge between an electrode in the vessel and the master medium; and a gas introduction unit for introducing reactive gas into the vessel. In this case, in a pressure reduced state, reactive gas is introduced into the vessel, then a plasma discharge is generated, thereby burning and removing an article stuck to a surface of the master medium.

For the cleaning of the master medium in accordance with the present invention, a plasma etching technology or the like for removing an oxide film, which is used in the manufacturing process of an integrated circuit, is used. In addition, the cleaning of the master medium is preferably carried out in linkage with the magnetic transfer, and the master medium should preferably be cleaned for each magnetic transfer process or for every predetermined number of magnetic transfer operations. In such a case, it is preferred that a plurality of master media are prepared, and successively cleaned.

The decompression vessel of the cleaning apparatus is opened/closed to replaceably house the master medium. The pressure reducing unit includes a vacuum pump, and reduces a pressure inside the vessel to a predetermined level. The discharge unit has one pole in electrical continuity with the master medium. Moreover, the discharge unit includes a DC power source or an RF power source for applying a discharge voltage between the master medium and an electrode disposed in the vessel opposite to the pole, and generates a plasma discharge on the master medium. The gas introduction unit introduces the predetermined amount of reactive gas having high reactivity into the vessel.

According to the present invention, the magnetic transfer is performed by bringing the slave medium before the formation of the lubricating layer on the surface and the master medium into close contact with each other. Thus, it is possible to prevent an increase in a close contact force caused by the meniscus of the lubricating layer and facilitate the peeling-off of the slave medium after the magnetic transfer, thereby enhancing workability. It is also possible to prevent the damage of the slave medium and to prolong the life of the master medium.

Without adsorbing the dust stuck to the master medium on the lubricating layer of the slave medium during close contact, it is possible to suppress the increase of an error rate, thus enhancing reliability. Particularly with regard to flexible discs, as the possibility of substrate deformation damage caused by contaminant attachment thereto is high, the method of the present invention is effective as a method to prevent an increase in errors of a magnetically transferred signal.

According to the invention, in the magnetic transfer performed by bringing the master medium having transfer information and the slave medium into close contact with each other and applying a transfer magnetic field, when the recording plane of the slave medium and the information bearing plane of the master medium are brought into close contact with each other through liquid, a close contact distance therebetween becomes a fixed value equivalent to the coating thickness of the liquid on the full surface. As a result, the magnetic transfer can be carried out by a uniform characteristic to increase transfer signal quality, and provide a better intensity distribution of reproducing outputs. A sufficient tracking function can be provided in the case of a servo signal, improving reliability.

In addition, a meniscus force is applied by the liquid interposed between the close contact surfaces, increasing a close contact force between the slave medium and the master medium. Thus, without applying any excessive pressing forces, it is possible to secure a good contact characteristic.

If the liquid has lubricity, lubricity is provided to the recording plane of the slave medium. Thus, the lubricant coating step is made unnecessary in the manufacturing process of the slave medium, contributing to the process simplification.

The close contact force is increased by the interposition of the liquid as described above. However, when the close contact between the slave medium and the master medium is released while the slave medium is moved after the magnetic transfer, the slave medium and the master medium can be separated from each other by a small force, thus enhancing workability. It is also possible to prevent the damage of the slave medium and prolong the life of the master medium.

Furthermore, according to the invention, the articles stuck to the surface of the master medium are burned and removed by using a plasma discharge under the atmosphere of pressure reduced reactive gas before the magnetic transfer. Thus, stuck articles such as fiber flocks can be removed in non-contact in a dry process. Therefore, as opposed to cleaning by ultrasonic washing, wiping or the like using a washing solution, even fine grains can be removed without re-adhesion of the removed articles to the master medium, or without leaving any water marks or causing rubbing damage. As a result, it is possible to prevent the deterioration of a transfer signal caused by a close contact failure between the master medium and the slave medium, enhance reliability by executing magnetic transfer of a stable quality, and prolong the life of the master medium.

DESCRIPTION OF THE PREFERRED EMBODIMENTS

Figure 1:
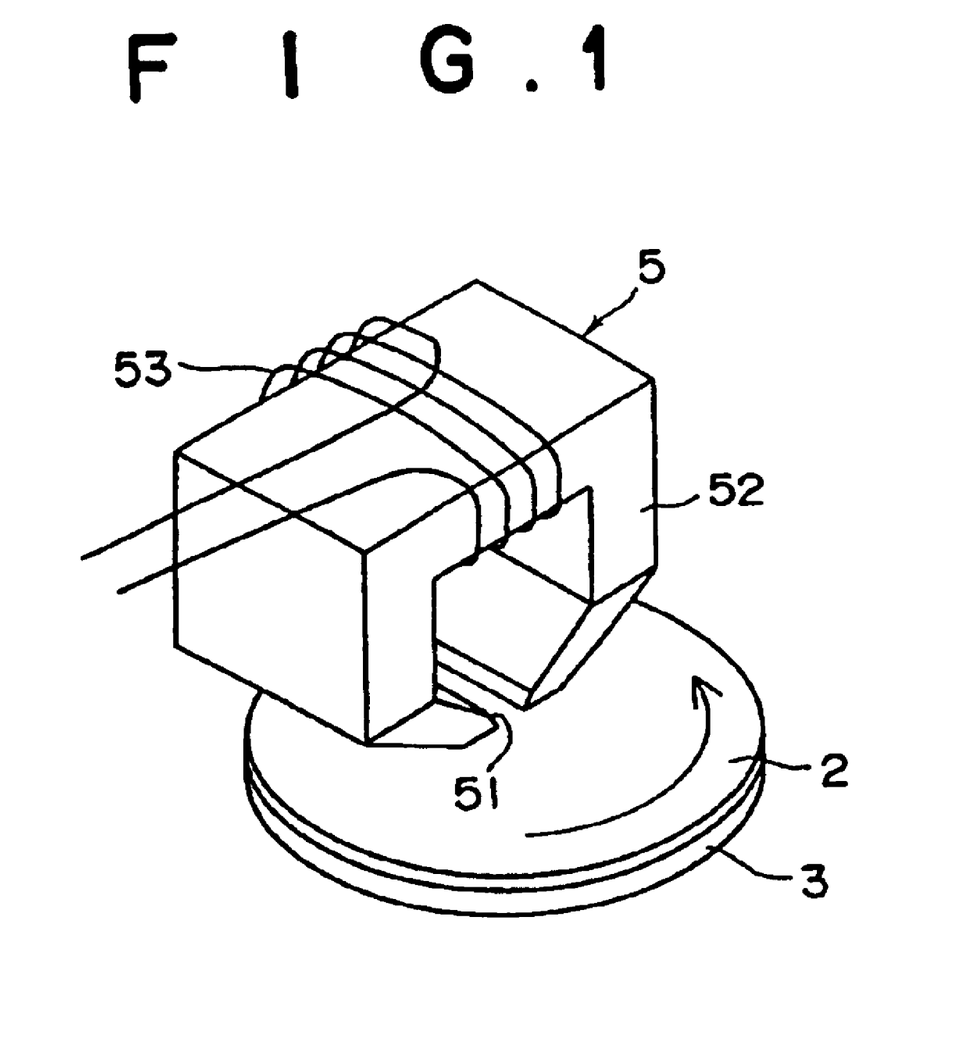
FIG. 1 is a perspective view showing main portions in a magnetic transferring method according to an embodiment of the present invention.

Next, preferred embodiments of the present invention will be described in detail. FIG. 1 shows a transfer state of a magnetic transferring method according to an embodiment of the present invention. FIG. 1 is a schematic drawing, showing thicknesses and the like in ratios different from actual dimensions.

In FIG. 1, during magnetic transfer, a magnetic recording plane of a slave medium 2 having no lubricating layers formed on the surface is brought into contact with an information bearing plane of a master medium 3, and closely contacted therewith by a predetermined pressing force. In the close contact state of the master medium 3 and the slave medium 2, information such as a servo signal or the like is magnetically transferred and recorded by applying a transfer magnetic field by use of a magnetic field generator 5.

After the end of the magnetic transfer, the close contact between the slave medium 2 and the master medium 3 is released, and the slave medium 2 is separated from the master medium 3 and unloaded. On the recording plane of the slave medium 2 after the magnetic transfer, a solution containing lubricant is uniformly coated by dip coating, spin coating, bar coating or the like, and dried to form a lubricating layer.

According to the embodiment, during the magnetic transfer, because of no lubricating layers formed on the surface of the slave medium 2, a close contact force with the master medium 3 is not increased. Thus, the slave medium 2 can be separated from the master medium 3 by a small force, making it possible to improve workability, prevent the damage of the slave medium 2, and prolong the life of the master medium 3. Moreover, dust stuck to the master medium 3 can be prevented from being adsorbed during the close contact, and dust stuck to the slave medium even after the magnetic transfer can be reduced and removed in the post-treatment. Thus, no increases occur in an error rate, and reliability can be enhanced.

Figure 2:
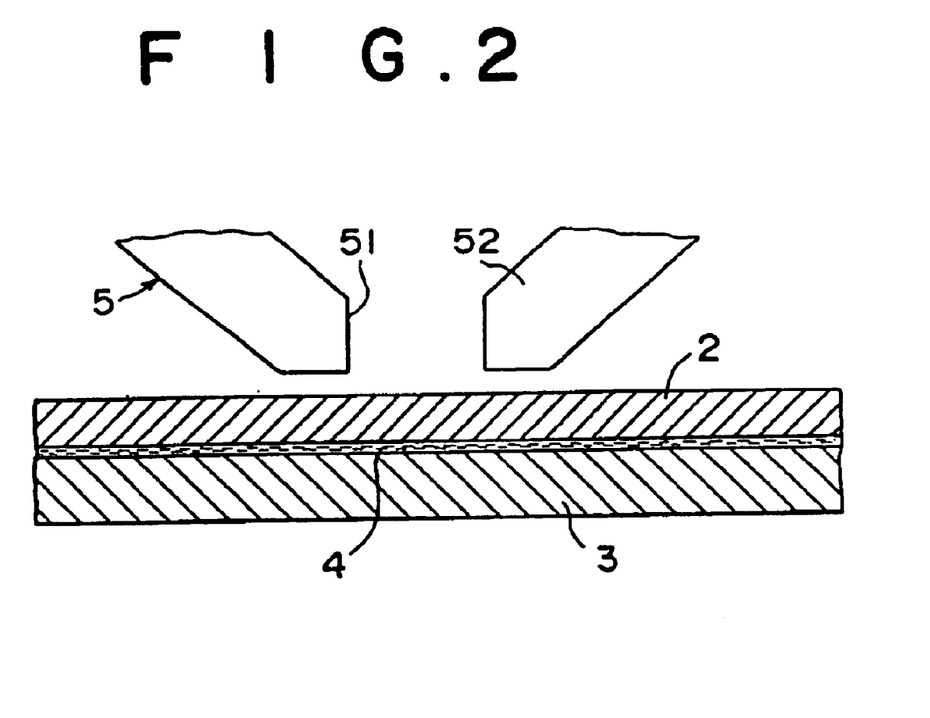
FIG. 2 is a sectional view showing main portions in the magnetic transferring method according to another embodiment of the present invention.

Now, another embodiment of the invention will be described in detail. FIG. 2 shows the transfer state of a magnetic transferring method according to another embodiment of the invention. FIG. 2 is a schematic drawing, showing thicknesses, and so on, in ratios different from actual dimensions.

In FIG. 2, during the magnetic transfer, the magnetic recording plane of the slave medium 2 is brought into close contact with the information bearing plane of the master medium 3 through a liquid layer 4 having a uniform thickness of 100 nm or less, and pressed by a predetermined pressure. In the close contact state of the master medium 3 and the slave medium 2, information such as a servo signal or the like is magnetically transferred and recorded by applying a transfer magnetic field by use of the magnetic field generator 5.

The liquid layer 4 is preferably formed in a manner that immediately before the slave medium 2 is brought into close contact with the master medium 3, a predetermined amount of liquid is coated uniformly on the information bearing plane of the master medium 3 or the recording plane of the slave medium 2 by dip coating, spin coating, bar coating or the like, both are closely contacted to each other and pressed by a predetermined pressure, and the liquid is laid to have a thickness uniform on a full surface. In the close contact state, a meniscus force by the liquid present on the close contact surface works to increase a close contact force between the slave medium 2 and the master medium 3. Thus, a good close contact characteristic can be provided without applying any excessive pressing force.

A thickness of the liquid layer 4, i.e., a close contact distance between the recording plane of the slave medium 2 and the information bearing plane of the master medium 3, should be set equal to 100 nm or less, preferably in the range of 2 to 50 nm. Liquid having a viscosity characteristic providing such a thickness is selected. Especially, liquid having lubricity is preferred, and lubricant or other additives may be mixed in a solvent thereof. For example, as liquid having lubricity, an organic solvent containing stearic acid is available.

Known substances such as hydrocarbon lubricants, fluorocarbon lubricants, and extreme pressure additives may be used as the lubricant. Examples of hydrocarbon lubricants include carbonic acids such as stearic acid and oleic acid, esters such as stearic butyl, sulfonic acids such as octadecylsufonic acid, ester phosphates such as monooctadecyl phosphate, alcohols such as stearyl alcohol and oleyl alcohol, carbonic amides such as stearine amide, and amines such as stearyl amine.

Examples of fluorocarbon lubricants include the aforementioned hydrocarbon compounds with some or all of their alkyl groups replaced by fluoroalkyl groups or perfluoropolyether groups. Examples of perfluoropolyether groups include pertluoromethylene oxide polymers, perfluoroethylene oxide polymers, perfluoro-n-propylene oxide polymers $(CF_2CF_2CF_2O)_n$, perfluoroisopropylene oxide polymers $(CF(CF_3)CF_2O)_n$ or copolymers of the above.

Examples of extreme pressure additives include phosphate esters such as trilauryl phosphate, phosphite esters such as trilauryl phosphite, thiophosphite esters such as trilauryl trithiophosphite, thiophosphate esters, and sulfur extreme pressure solutions such as disulfide dibenzyl.

The lubricants described above are used either singly or in combination. In order to provide said lubricants to the magnetic layer or the protective layer, the lubricants) should be dissolved in an organic solution, then coated thereon by a wire bar method, a gravure method, a spin coat method, or a dip coat method. Alternatively, the lubricant may be coated on said layers by a vacuum evaporation method. It is preferable that the amount of lubricant to be coated on the magnetic layer or the protective layer is 1~30 mg/m$^2$, and more preferably, 2~20 mg/m$^2$.

After the completion of the magnetic transfer, because of the interposition of the liquid layer 4, the slave medium 2 and the master medium 3 have been adhered to each other by a large close contact force. Simple peeling-off may cause damage to the slave medium 2 or the master medium 3. Thus, after the magnetic transfer, the slave medium 2 is separated from the master medium 3 while being rotated in parallel to the master medium 3 or moved to be linearly shifted from the master medium 3 so as to be peeled off, and then the close contact therebetween is released. Therefore, the slave medium 2 can be separated from the maser carrier 3 by a small force. As a result, it is possible to enhance workability, prevent the damage of the slave medium 2, and prolong the life of the master medium 3.

The liquid stuck to the recording plane of the slave medium 2 after the magnetic transfer is removed. In the case of the liquid having lubricity, the liquid is not removed, but rather used continuously. If the liquid has lubricity, since lubricity is provided to the recording plane of the slave medium 2, a lubricant coating step is made unnecessary in the manufacturing process of the slave medium 2, contributing to the simplification of the process.

According to the foregoing embodiment, the liquid layer 4 interposed between the close contact surfaces of the slave medium 2 and the master medium 3 includes dust stuck to the slave medium 2 or the master medium 3. However, dust of a size equal to or smaller than the thickness of the layer 4 is present within the layer 4, not affecting the close contact distance, and a close contact distance uniform over the full surface is obtained. If there is dust of a size larger than the thickness of the layer 4, the close contact distance is large in a portion of the stuck dust. In the other portions, the close contact distance is equal to the thickness of the layer 4. Thus, compared with a contact distance in the state of no liquid, variation in the close contact distance on the full surface is reduced, a difference in transfer characteristics is smaller during transfer, and a difference in the reproducing outputs of the transfer signals is reduced.

In each of FIGS. 1 and 2, the slave medium 2 should preferably be a hard disk having magnetic recording layers formed on both surfaces. Before being brought into close contact with the master medium 3, the slave medium 2 is subjected to cleaning, when necessary, to remove very small projections or stuck dust on the surface by a glide head, a polisher or the like. The present invention can be applied to magnetic transfer carried out for a flexible disk, especially one having a metallic thin-film magnetic recording layer.

The master medium 3 is formed in a disk shape. In one surface thereof, a transfer information bearing plane is provided by a micro uneven pattern (described later by referring to FIG. 2). A plane opposite to the transfer information bearing plane is held by an adhering unit (not-shown), and then brought into close contact with the conveyed slave medium 2. There are two transfer operation cases. One is a one-sided sequential transfer carried out by keeping the master medium 3 in close contact with one plane of the slave medium; and the other is a double-sided simultaneous transfer carried out by keeping the master media 3 in close contact with both planes of the slave medium. The master medium 3 is subjected to cleaning, when necessary, to remove dust adhered thereon, before the close contact with the slave medium 2.

The magnetic field generator 5 for applying a transfer magnetic field is constructed in a manner that an electromagnet device for generating lines of magnetic force parallel to a tracking direction (a direction tangential to a circumferential track) or a permanent magnet device for generating similar lines of magnetic force is disposed in one side or both sides. The electromagnet device includes a coil 53 (not shown in FIG. 2) wound on a core 52, which has a gap 51 extended in the radial direction of the master medium 3 held by the adhering unit. During magnetic field application, a transfer magnetic field is applied by the magnetic field generator 5 while rotating the slave medium 2 and the master medium 3 in a united manner, and the transfer information of the master medium 3 is magnetically transferred and recorded on the recording plane of the slave medium 2. The magnetic field generator 5 may be provided so as to be rotationally moved.

Figure 3A:
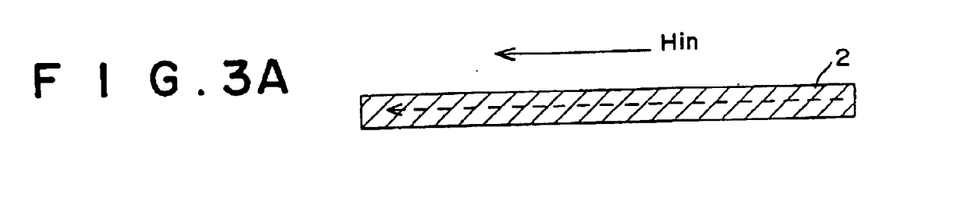
FIGS. 3A to 3C are views, each thereof showing a basic step of the magnetic transferring method of the embodiment of the present invention.
Figure 3B:
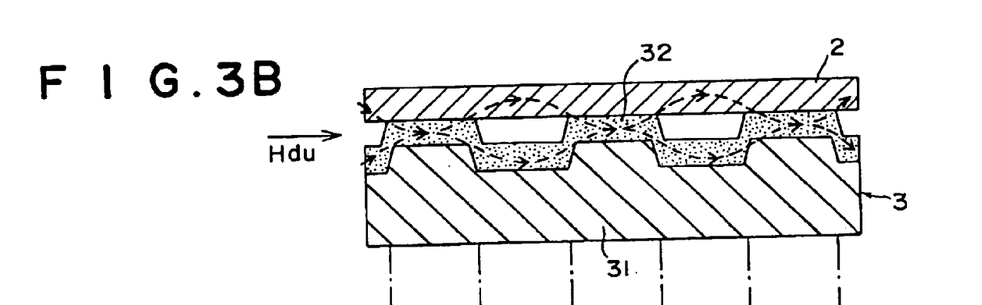
Figure 3C:
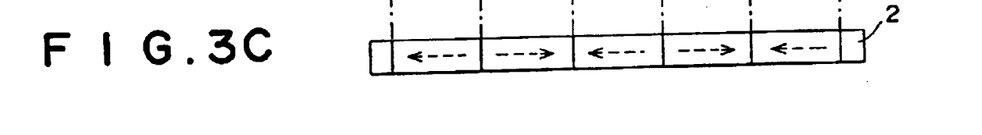

Next, description will be made by referring to FIGS. 3A to 3C, showing a basic process of the magnetic transfer. Specifically, FIG. 3A shows the step of subjecting the slave medium 2 to initial DC magnetization by applying a magnetic field in one direction; FIG. 3B the step of bringing the master medium 3 and the slave medium 2 into close contact with each other and applying a magnetic field in an opposite direction; and FIG. 3C a state after the magnetic transfer. The above-described liquid layer 4 is not shown in this case.

First, as shown in FIG. 3A, the slave medium 2 is subjected to initial magnetization (DC demagnetization) beforehand by applying an initial magnetic field Hin in one track direction. Then, as shown in FIG. 3B, the magnetic transfer plane of the slave medium 2 is brought into close contact with the information bearing plane of the master medium 3, which is formed by covering the micro uneven pattern of a substrate 31 with a magnetic layer 32, and magnetic transfer is carried out by applying a transfer magnetic field Hdu in a direction opposite to that of the initial magnetic field Hin in the track direction of the slave medium 2. As a result, as shown in FIG. 3C, information in accordance with the pattern formed by the close contact projection and the recess space of the magnetic layer 32 of the information bearing plane of the master medium 3 is magnetically transferred and recorded on the magnetic recording plane (track) of the slave medium 2.

Even when the uneven pattern of the substrate 31 of the master medium 3 is an uneven negative pattern opposite to the positive pattern of FIG. 2, similar information can be magnetically transferred and recorded by reversing the directions of the initial magnetic field Hin and the transfer magnetic field Hdu from the above.

When the substrate 31 is made of a ferromagnetic material such as Ni, the magnetic transfer can be carried out by use of the substrate 31 only, and it is not necessary to cover the substrate 31 with the magnetic layer 32 (soft magnetic layer). However, better magnetic transfer can be carried out by providing the magnetic layer 32 having a good transfer characteristic. When the substrate 31 is made of a nonmagnetic material, it is necessary to provide the magnetic layer 32.

When the substrate 31 made of ferromagnetic metal is covered with the magnetic layer 32, preferably, a nonmagnetic layer should be provided between the substrate 31 and the magnetic layer 32 in order to shield influence of magnetism of the substrate 31. Further, a protective film made of diamond-like carbon (DLC) or the like is formed on the uppermost layer. By this protective film, resistance to contact can be improved, and the magnetic transfer can be carried out many times. A Si film may be formed under the DLC protective film by sputtering or the like.

Now, the master medium 3 will be described. For the substrate 31 of the master medium 3, one is selected for use from nickel, silicon, quartz plate, glass, aluminum, an alloy, ceramic, a synthetic resin and the like. The formation of the uneven pattern is carried out by a stamper method, a photofabrication method or the like.

According to the stamper method, a photoresist is formed on a glass plate (or quartz plate) having a smooth surface by spin coating or the like. A laser beam (or electron beam) modulated corresponding to a servo signal is radiated onto the photoresist while this glass plate is rotated. Then, a predetermined pattern is formed by exposure on the full surface of the photoresist. For example, the pattern extending linearly from a rotational center in the radial direction in each track and corresponding to a servo signal is formed by exposure in the portion corresponding to each frame on a circumference of the glass plate. Subsequently, the photoresist is subjected to development processing, the exposed portions are removed, and an original disk having an uneven pattern by the photoresist is obtained. Then, in accordance with the uneven pattern of the surface of the original disk, this surface is plated (electroforming), a Ni substrate having a positive uneven pattern is formed, and peeled off from the original disk. This substrate is used directly as a master medium, or covered with a nonmagnetic layer, a soft magnetic layer and a protective layer when necessary to be used as a master medium.

The original disk may be plated to prepare a second original disk. By using this second original disk to carry out plating, a substrate having a negative uneven pattern may be formed. Further, a third original disk may be prepared by plating the second original disk or pressing resin liquid to the second original disk to carry out hardening. By plating the third original disk, a substrate having a positive uneven pattern may be formed.

On the other hand, after a pattern is formed by the photoresist on the glass plate, a hole may be formed in the glass plate by etching, and an original disk may be obtained by removing the photoresist. By a process similar to the above thereafter, a substrate may be formed.

As a material for the metallic substrate, Ni or a Ni alloy can be used and, for the plating carried out to form the substrate, various metal film growth methods including electroless plating, electroforming, sputtering and ion plating can be used. A depth (projection height) of the uneven pattern of the substrate should preferably be set in the range of 80 nm to 800 nm, more preferably in the range of 150 nm to 600 nm. In the case of a servo signal, this uneven pattern is formed to be long in a radial direction. For example, a length in a radial direction should preferably set in the range of 0.2 to 20 $\mu$m; and that in a circumferential direction in the range of 0.1 to 5 $\mu$m. The selection of a pattern having a longer length in the radial direction than that in the circumferential direction within such a range is preferable for bearing the information of a servo signal.

The formation of the magnetic layer 32 (soft magnetic layer) is carried out by using a plating method, a vacuum film growth means such as a vacuum evaporation method, a sputtering method and an ion plating method or the like to deposit a magnetic material. As a material for the magnetic layer, one can be selected for use from Co, a co alloy (CoNi, CoNiZr, CoNbTaZr or the like), Fe, and Fe alloy (FeCo, FeCoNi, FeNiMo, FeAlSi, FeAl, FeTaN), Ni and a Ni alloy (NiFe). FeCo and FecoNi are particularly preferable. A thickness of the magnetic layer should preferably be set in the range of 50 nm to 500 nm, more preferably in the range of 100 nm to 400 nm. AS a material for the nonmagnetic layer provided as a base layer under the magnetic layer, one can be selected for use from Cr, CrTi, CoCr, CrTa, CrMo, NiAl, Ru, C, Ti, Al, Mo, W, Ta, Nb, and so on. This nonmagnetic layer can suppress a reduction in a signal quality when the substrate is made of a ferromagnetic material.

Preferably, a protective film made of DLC or the like should be provided on the magnetic layer, and a lubricant layer may also be provided. It is more preferred that a DLC film and a lubricant film which have a thickness of 5 to 30 nm in total are provided as the protective film. In addition, a close contact strengthening layer made of Si or the like may be provided between the magnetic layer and the protective film. Lubricant lessens the deterioration in durability caused by damage given by friction when slippage of the master medium caused during the contact process with the slave medium is corrected.

A resin substrate may be manufactured by using the above-described original disk, and used as a master medium by providing a magnetic layer on the surface thereof. As a resin material for the resin substrate, one can be selected for use from an acrylic resin such as polycarbonate-polymethylmethacrylate, a vinyl chloride resin such as poly vinyl chloride-vinyl chloride copolymer, an epoxy resin, amorphous polyolefin, polyester, and the like. Polycarbonate is preferred considering humidity resistance, dimension stability, costs, and so on. If there are burrs in a molded component, the burrs are removed by burnishing or polishing. In addition, by using an ultraviolet curing resin, an electron beam curing resin or the like, the substrate may be formed by means of spin coating or bar coating. A height of the pattern projection of the resin substrate should preferably be set in the range of 50 to 1000 nm, more preferably in the range of 200 to 500 nm.

The master medium is obtained by covering the micropattern of the surface of the resin substrate with a magnetic layer. The formation of the magnetic layer is carried out by using a plating method, a vacuum film growth means such as a vacuum evaporation method, a sputtering method, an ion plating method or the like to deposit a magnetic material.

On the other hand, in the lithography method, for example, a photoresist is coated on the smooth surface of the flat-plate substrate and a pattern in accordance with the information is formed by exposure and development processing by use of a photomask in accordance with the pattern of a servo signal. Then, in an etching step, the substrate is subjected to etching in accordance with the pattern, and holes of depths equivalent to the thickness of the magnetic layer are formed. Then, a magnetic material is grown up to the surface of the substrate so as to have a thickness corresponding to the hole by a plating method or a vacuum film growth means such as a vacuum evaporation method, a sputtering method, or an ion plating method to deposit a magnetic material. Then, the photoresist is removed by a lift-off method, and the surface of the substrate is polished. If there are burrs, the burrs are removed, and the surface is made smooth.

Now, the slave medium 2 will be described. For the slave medium, a coating type magnetic recording medium or a metallic thin-film magnetic recording medium is used. As the coating type magnetic recoding medium, a commercially available medium such as a high-density flexible disk or the like can be used. Regarding the metallic thin-film magnetic recording medium, first for a magnetic material, one can be selected for use from Co, a Co alloy (CoPtCr, CoCr, CoPtCrTa, CoPtCrNbTa, CoCrB, CoNi or the like), Fe, and an Fe alloy (Feco, FePt, FeCoNi). These magnetic materials have large magnetic flux densities and magnetic anisotropy in a similar direction to the slave medium (the direction is parallel to the surfaces of the master medium and the slave medium in the case of an in-plane recording, and the direction is perpendicular to the surfaces of the master medium and the slave medium in the case of a perpendicular recording), and are thus preferable because a clear transfer can be performed by use of them. A nonmagnetic base layer should preferably be provided in order to set necessary magnetic anisotropy under the magnetic material (support side). The nonmagnetic base layer needs to coincide with the magnetic layer in a crystal structure and a lattice constant. Thus, one is selected for use from Cr, CrTi, CoCr, CrTa, CrMo, NiAl, Ru, and so on.

Figure 4:
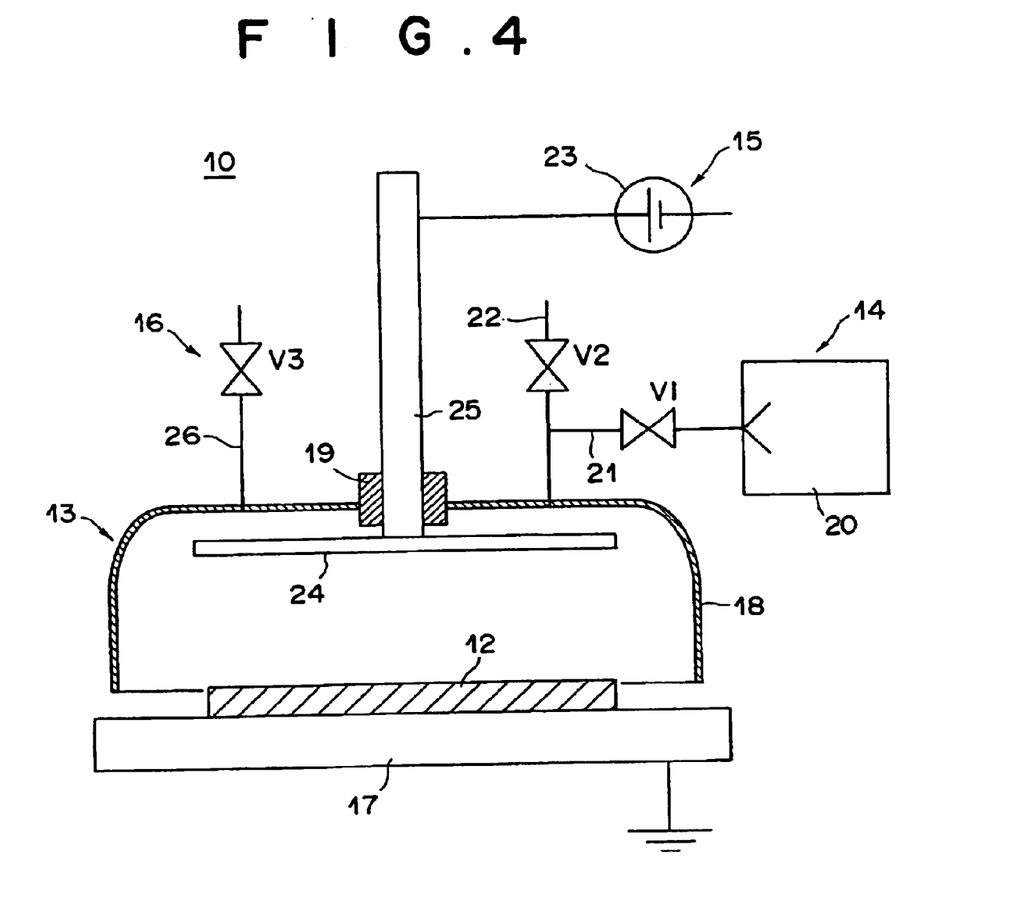
FIG. 4 is a view schematically showing a cleaning apparatus according to yet another embodiment of the present invention.

Next, yet another embodiment of the invention will be described in detail. FIG. 4 schematically shows a mechanism of a cleaning apparatus.

A cleaning apparatus 10 shown in FIG. 4 includes: a decompression vessel 13 (vacuum chamber) for housing a master medium 12; a pressure reducing unit 14 for reducing a pressure in the vessel 13; a discharge unit 15 for generating a plasma discharge between a electrode 24 in the vessel 13 and the master medium 12; and a gas introduction unit 16 for introducing reactive gas into the vessel 13.

A cleaning method using the apparatus 10 is designed to remove articles stuck to the surface of the master medium 12 before the magnetic transfer in a non-contact manner in a dry process utilizing reactive plasma etching. In other words, in the pressure reduced state, reactive gas is introduced into the vessel 13 to generate a discharge, and the articles stuck to the surface of the master medium 12 are burned and removed by a plasma discharge.

The decompression vessel 13 has a cap-shaped cover member 18 placed over a base member 17 to hermetically seal the internal space. The base member 17 and the cover member 18 are moved relatively into contact with/away from each other to open/close the internal space, and the master medium 12 is housed inside so as to be replaced by another. The master medium 12 is placed on the base member 17. This master medium 12 is set in electrical continuity with the electrically grounded base member 17 to become one pole during discharge, to be described below.

The pressure reducing unit 14 includes a vacuum pump 20, A pressure reduction passage 21 from the vacuum pump 20 is connected to the cover member 18 and, the pressure is reduced to a predetermined level by sucking the inside air of the vessel 13. A first valve V1 in disposed in the reduced pressure passage 21. This valve V1 is controlled to be opened during pressure reduction and closed during pressure reduction releasing. In addition, the pressure reduction passage 21 is provided with a leak passage 22 joining the vessel 13 side of the first valve V1. This leak passage 22 is communicated with a leak port, and provided with a second valve V2 disposed midway thereto, The second valve V2 is controlled to be closed during pressure seduction and to be opened when the pressure reduction is finished in order to leak to the atmosphere.

The discharge unit 15 includes a power source 23 (DC power source) for generating a discharge voltage and the plate-shaped discharge electrode 24 disposed inside the cover member 18. This discharge electrode 24 is held by a supporting member 25 penetrating the cover member 18 and connected to the power source 23 by an electric conducting member (not shown) disposed inside the supporting member 25. An insulating seal 19 is provided between the supporting member 25 and the cover member 18, and the cover member 18 is in an electrically insulated states. The discharge electrode 24 is placed opposite to the master medium 12 placed on the base member 17. A discharge voltage generated by the power source 23 is applied between the discharge electrode 24 and the master medium 12 to generate a plasma discharge in the master medium 12. For the power source 23, an RF power source may be used as described later.

The gas introduction unit 16 includes a gas tank (not shown) for storing reactive gas. A gas introduction passage 26 from the gas tank is connected to the cover member 18, and the predetermined amount of reactive gas having high reactivity is introduced into the vessel 13. A third valve V3 is disposed in the gas introduction passage 26 and controlled to be opened during gas introduction. The reactive gas has a composition containing, for example Ar, $O_2$, $CCl_4$, and the like.

Now, the operation of the cleaning apparatus 10 constructed in the foregoing manner will be described. First, the decompression vessel 13 is opened by moving the base member 17 or the cover member 18, and the master medium 12 is placed in a predetermined position on the base member 17 with the information bearing plane up, the information bearing plane having a micro uneven pattern formed by a magnetic material. The decompression vessel 13 is set in a hermetically sealed state by moving the base member 17 or the cover member 18. The first valve V1 is opened while the second valve V2 is closed. Then, by driving the vacuum pump 20, air inside the vessel 13 is sucked to reduce an inner pressure to a predetermined level. After the predetermined pressure reduced state has been set, the third valve v3 is opened to introduce reactive gas through the gas introduction passage 26 into the vessel 13. When a predetermined gas composition is set inside the vessel 13, a discharge voltage is applied between the discharge electrode 24 and the master medium 12 by the power source 23 (DC power source), and a plasma discharge is generated in the master medium 12. By the plasma discharge of the reactive gas, the articles stuck to the surface of the master medium 12 are burned and removed by plasma etching.

After the completion of cleaning carried out for a predetermined time, while the first and third valves V1 and V3 are maintained in closed states, the second valve V2 is opened to leak to the atmosphere. Air is introduced through the leak passage 22 to increase the pressure inside the vessel 13 to an atmospheric pressure. Then, the decompression vessel 13 is opened by moving the base member 17 or the cover member 18, and the master medium 12 on the base member 17 is taken out. A next master medium 12 is loaded, and a cleaning process similar to the above is performed thereafter.

After the cleaning, the master medium 12 is conveyed to the magnetic transfer device. The information bearing plane of the master medium 12 and the recording plane of the slave medium subjected to initial magnetization in a track direction beforehand are brought into close contact with each other. In this close contact state, a transfer magnetic field is applied in a direction substantially opposite to that of the initial magnetization by a magnetic field application device such as an electromagnet, and a magnetization pattern corresponding to transfer information of the master medium 12 is transferred and recorded in the slave medium.

Preferably, the cleaning of the master medium 12 should be performed in linkage with the magnetic transfer. For each magnetic transfer process or for every predetermined number of magnetic transfer operations, the master medium 12 is subjected to the cleaning. In this case, it is preferred for efficiency that a plurality of master media 12 are prepared, and successively changed to cleaned ones. The cleaning apparatus 10 is incorporated in a part of the magnetic transfer device. The master medium 12 is taken out from the magnetic transfer part in linkage with the magnetic transfer operation, and conveyed to the cleaning apparatus 10 to be cleaned.

The master medium is formed by covering the micro uneven pattern of the substrate with the magnetic layer (metallic thin film). If the substrate is made of a ferromagnetic material such as Ni, the magnetic transfer can be carried out by the substrate only, and it is not necessary to cover the substrate with the magnetic layer (soft magnetic layer). However, better magnetic transfer can be carried out by providing the magnetic layer having a good transfer characteristic. If the substrate is made of a nonmagnetic material, it is necessary to provide the magnetic layer. In order to ground the information bearing plane and to generate a discharge along the information bearing plane by the DC power source 23 when the master medium 12 is loaded on the base member 17, preferably, the substrate of the master medium 12 should be made of a conductive material. Alternatively, if the substrate of the master medium 12 is made of an insulating material, preferably, a magnetic layer should be formed on the uneven pattern after a conductive layer is laminated on the substrate.

Moreover, for the power source 23 of the discharge unit 15, an RF power source may be used in place of the DC power source. In such a case, even if the master medium 12 is insulative, and not grounded to the base member 17, the cleaning can be carried out, which is designed to generate a plasma discharge on the surface of the master medium 12, and burn and remove the articles adhered thereon.

According to the foregoing embodiment of the invention, for the master medium 12 for magnetic transfer before the execution of magnetic transfer in close contact with the slave medium, cleaning is performed in a non-contact manner in a dry process by the cleaning apparatus 10, which uses plasma etching by a plasma discharge under the atmosphere of pressure-reduced reactive gas, and then burns and removes the articles stuck to the surface. Thus, it is possible to perform good cleaning without re-adhesion of any removed articles, or without leaving any water marks or causing rubbing damage on the surface. It is also possible to perform high quality magnetic transfer by enhancing a close contact characteristic with the slave medium during the magnetic transfer. It is further possible to prolong the life of the master medium by preventing the damage of the master medium.

What is claimed is:

1. A magnetic transferring method comprising the steps of:
   bringing a master medium and a slave medium into close contact with each other, the master medium bearing information signals;
   applying a transfer magnetic field; and
   performing magnetic transfer,
   wherein a recording plane of the slave medium and an information bearing plane of the master medium are brought into close contact with each other, with liquid in an amount of 2 to 20 mg/m2 intervening therebetween.

2. The magnetic transferring method according to claim 1, wherein said liquid has lubricity.

3. The magnetic transferring method according to claim 1, wherein said liquid having lubricity is coated on the recording plane of the slave medium.

4. The magnetic transferring method according to claim 2, wherein said liquid having lubricity is coated on the recording plane of the slave medium.

5. The magnetic transferring method according to any one of claims 1 to 4, wherein after the magnetic transfer, the close contact between the slave medium and the master medium is released while the slave medium is moved.

* * * * *